United States Patent [19]

Bacardit

[11] Patent Number: 4,512,238
[45] Date of Patent: Apr. 23, 1985

[54] HYDRAULIC DISTRIBUTOR WITH A REACTION BIASED CONTROL MEMBER

[75] Inventor: Juan S. Bacardit, Barcelona, Spain

[73] Assignee: Bendiberica S.A., Barcelona, Spain

[21] Appl. No.: 457,091

[22] Filed: Jan. 10, 1983

[30] Foreign Application Priority Data

Jan. 14, 1982 [ES] Spain ................................. 509.159

[51] Int. Cl.³ .............................................. F15B 9/10
[52] U.S. Cl. ....................................... 91/370; 91/434; 180/132; 137/625.21
[58] Field of Search ................. 91/370, 371, 372, 373, 91/433, 434; 180/141, 143, 132; 137/625.21

[56] References Cited

U.S. PATENT DOCUMENTS

| | | | |
|---|---|---|---|
| 3,744,515 | 7/1973 | Inoue | 180/143 X |
| 4,000,785 | 1/1977 | Nishikawa et al. | 180/143 |
| 4,119,172 | 10/1978 | Yanagishima et al. | 180/141 |
| 4,285,267 | 8/1981 | Bacardit | 91/434 |
| 4,331,211 | 5/1982 | Lang | 180/141 |
| 4,335,749 | 6/1982 | Walter | 91/372 X |
| 4,461,321 | 7/1984 | Bacardit | 137/625.21 |
| 4,465,098 | 8/1984 | Bacardit | 137/625.21 |

FOREIGN PATENT DOCUMENTS

| | | | |
|---|---|---|---|
| 0011036 | 5/1980 | European Pat. Off. | |
| 53560 | 6/1982 | European Pat. Off. | 180/132 |
| 0066507 | 12/1982 | European Pat. Off. | |
| 0072731 | 2/1983 | European Pat. Off. | |
| 2308001 | 11/1976 | France | |
| 2435380 | 4/1980 | France | |
| 2442753 | 6/1980 | France | |
| 893662 | 12/1981 | U.S.S.R. | 180/132 |

Primary Examiner—Robert E. Garrett
Assistant Examiner—Timothy E. Nauman
Attorney, Agent, or Firm—Larry J. Palguta; Ken C. Decker

[57] ABSTRACT

The distributor, embodying two mutually displaceable primary (35) and secondary (38, 43) members, includes a reaction device (37, 39, 40) operated by externally modulated reaction pressures, the reaction device having opposite inlets connected to independent circuits (22, 23) extending from corresponding outlets of valve means having OR logic function (24) actuated by the primary member of the distributor (21) in a phase lead with respect to the internal valve means (1, 2; 1', 2') of the distributor.

15 Claims, 14 Drawing Figures

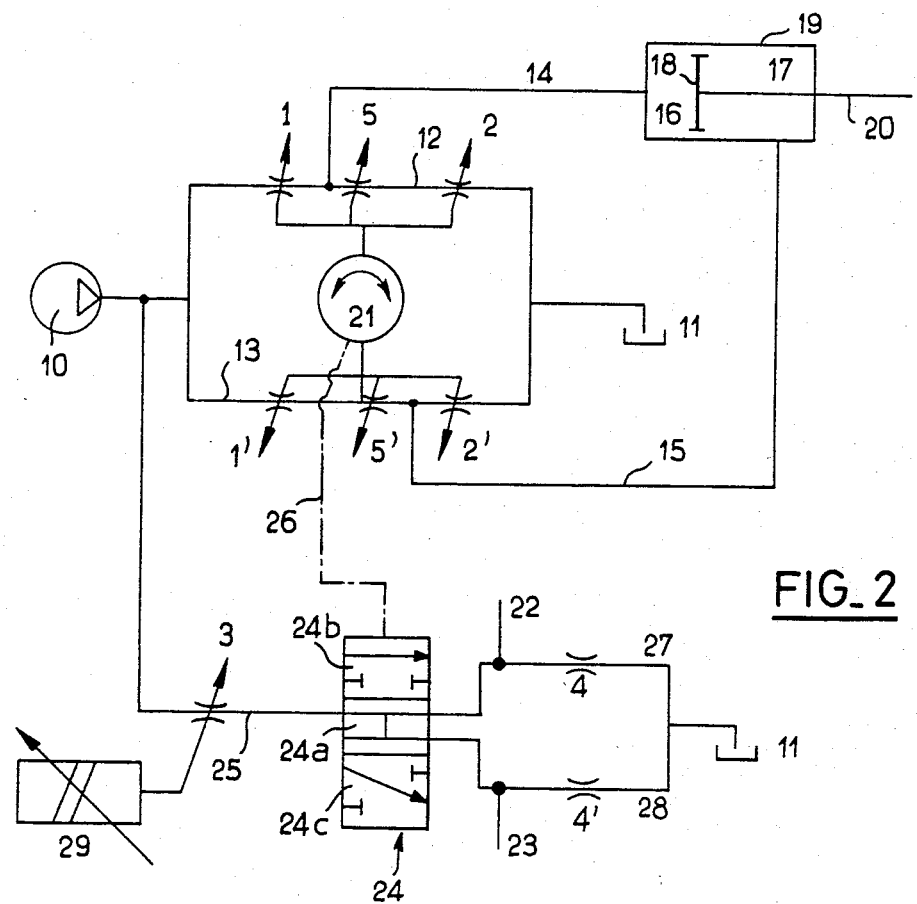
FIG._2
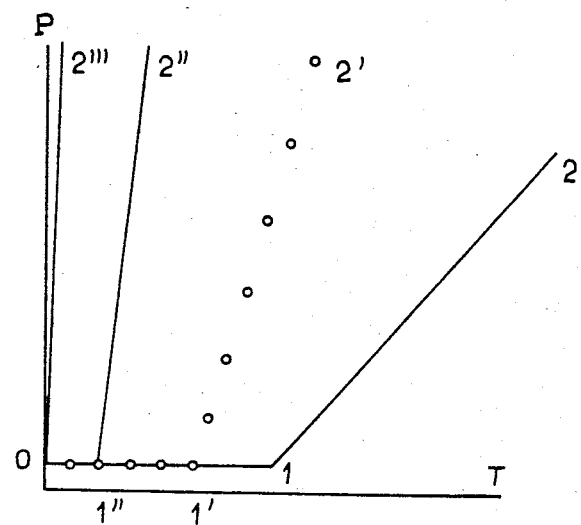
FIG._7

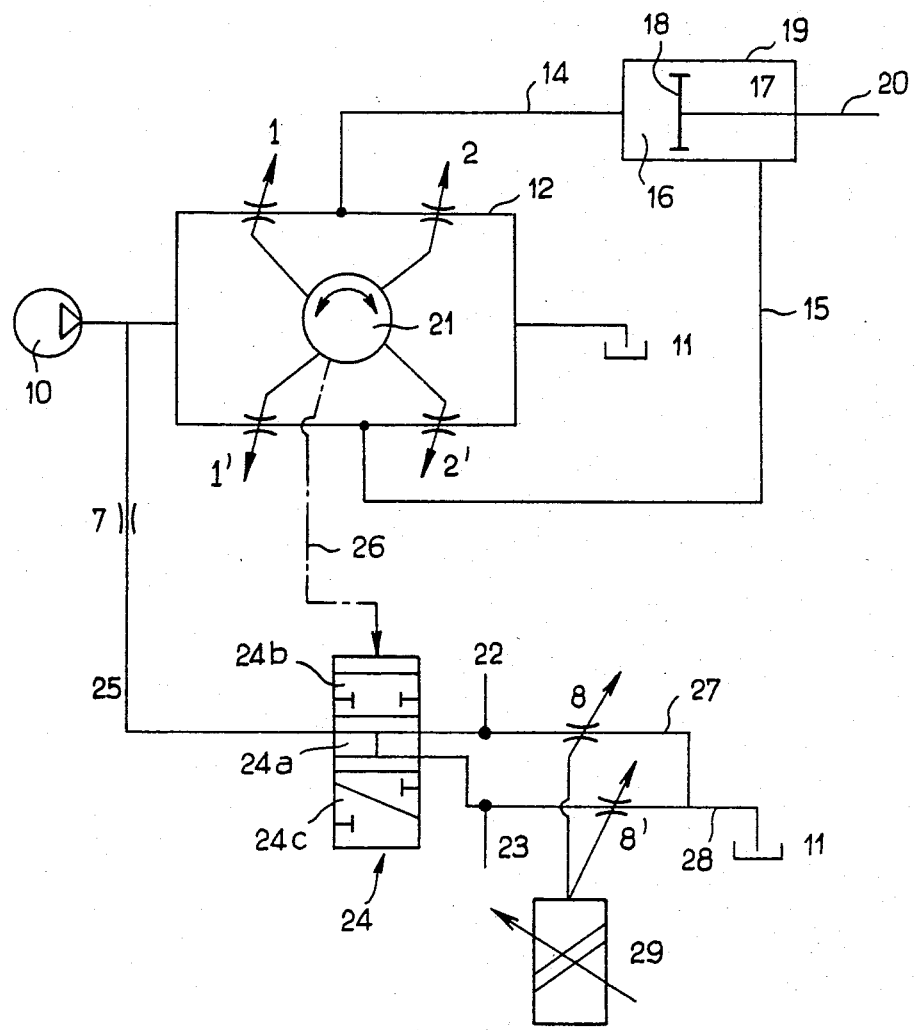
FIG_4

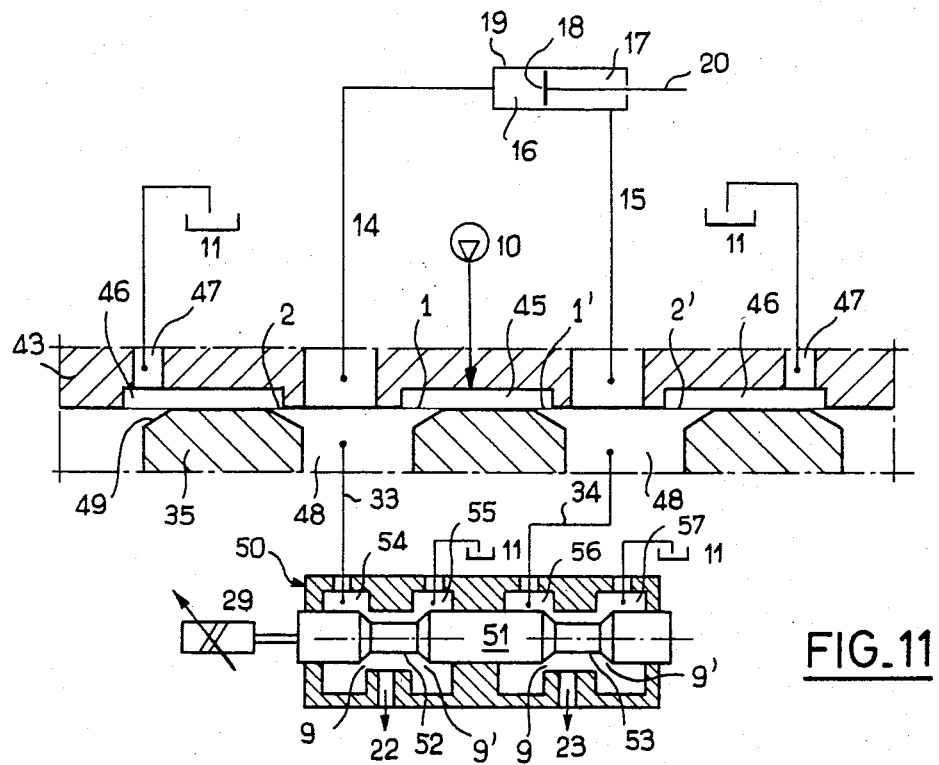
FIG_11
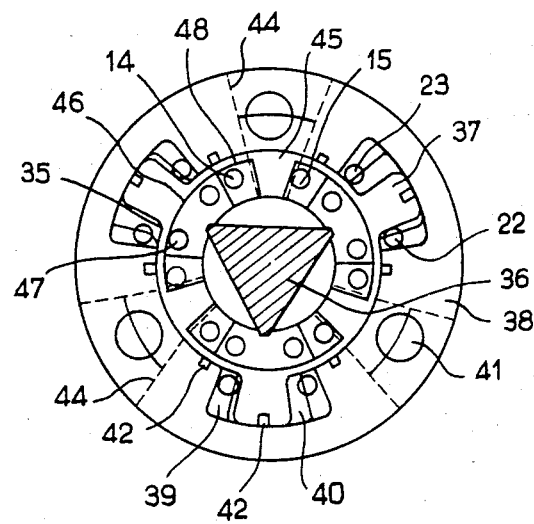
FIG_14

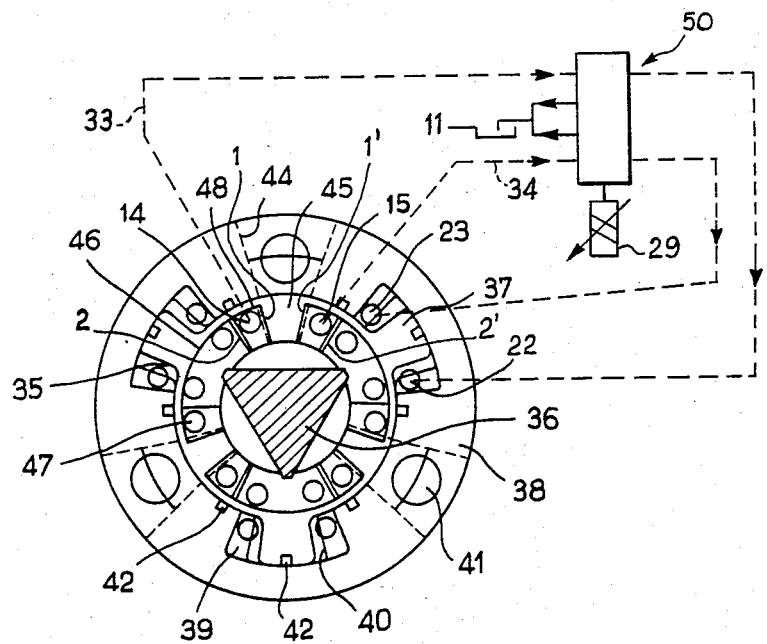
FIG_12
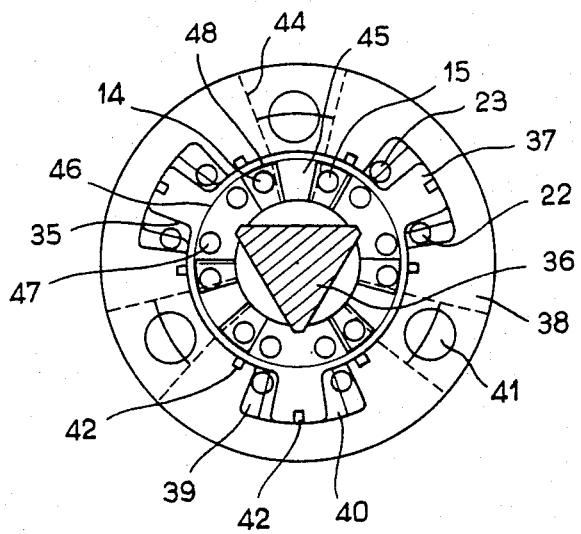
FIG_13

HYDRAULIC DISTRIBUTOR WITH A REACTION BIASED CONTROL MEMBER

The invention relates to a hydraulic distributor for servo-mechanisms, more particularly for assisted steering system of automotive vehicles, of the type generally illustrated in U.S. Pat. Nos. 4,217,932, and 4,310,024 incorporated by reference herein, and which comprise a primary member and a secondary member defining mutually a distributing valve means and associated via a lost-motion coupling allowing a limited relative displacement of said primary and secondary members on both side of a central rest position, the primary member being connected to an input actuating member, typically the steering wheel of the vehicle, and to a reaction device hydraulically actuated by reaction pressures which are modulated externally, the secondary member being connected to a driven mechanism, typically the steering linkage of the wheels of the vehicle, and to an hydraulic assistance cylinder or device controlled by the distributor.

Such an hydraulic distributor with a controllably biased reaction onto the input control member is disclosed in European patent application No. EP-A-82401455 to the Applicant.

The object of the present invention is to propose an arrangement of hydraulic distributor of the concerned class of simple design, low manufacturing cost, permitting to easily modulate in a great range of variations the characteristic torque/pressure of the distributor with respect to external parameters taken more particularly from driving conditions of the vehicle and more specifically permitting to modulate at will or automatically the central or zero-slope portion and the slope or reaction rate of the characteristic of the power assisted steering system.

In order to meet these objects and others, according to a feature of the invention, the opposite inlets of the reaction device are fed by independent circuits leading from corresponding outlets of a valve means having an OR logic function actuated by the primary member of the distributor in a phase lead with respect to the valve means of the distributor.

According to another feature of the invention, each independent circuit is derived from a corresponding modulation circuit including at least one variable restriction controlled externally on one side (upstream or downstream) of the OR valve means, and the modulating pressure can be obtained from the pressure inlet of the distributor or from the respective distribution conduits feeding the opposite working chambers of the assistance cylinder or device.

The present invention is more particularly suitable for hydraulic distributors comprising two parallel circuits between a pressure source and a sump, from each of which is derived a conduit leading respectively to the working chambers of the assistance device, restrictions actuated by the primary member being provided in each of said circuits on both sides of the point from which derives said circuit, said restrictions being actuated such as, in a first step, one restriction of the side of the sump closes for determining the hydraulic balance point of the steering system, and, in a second step, one of the restrictions on the side of the pressure source closes to create a pressure differential for controlling the assistance device.

The present invention is advantageously embodied in the socalled star-shaped hydraulic distributors comprising a rotor and a stator hermetically adjusted and respectively coupled to the primary and secondary members, pressure openings adjacent to discharge openings being formed within one of said members, working openings being formed within the other member between the openings of the first member, so as to define therebetween controllable restrictions, the rotor having arms defining in recesses of the stator reaction chambers which are independent of the working openings, the valve means having an OR logic function being thus constituted by pairs of restriction edges located on both sides of the inlet opening of the star-shaped distributor.

Other objects and advantages of the invention will emerge from the following description of different embodiments of the invention, made in reference with the appendent drawings, in which:

FIGS. 2, 3, 4 and 5 show respectively alternative embodiments of the distributor of FIG. 1;

FIGS. 6, 7 and 8 show the characteristic curves output pressure/actuating torque for the different embodiments of the invention;

Figure 9:
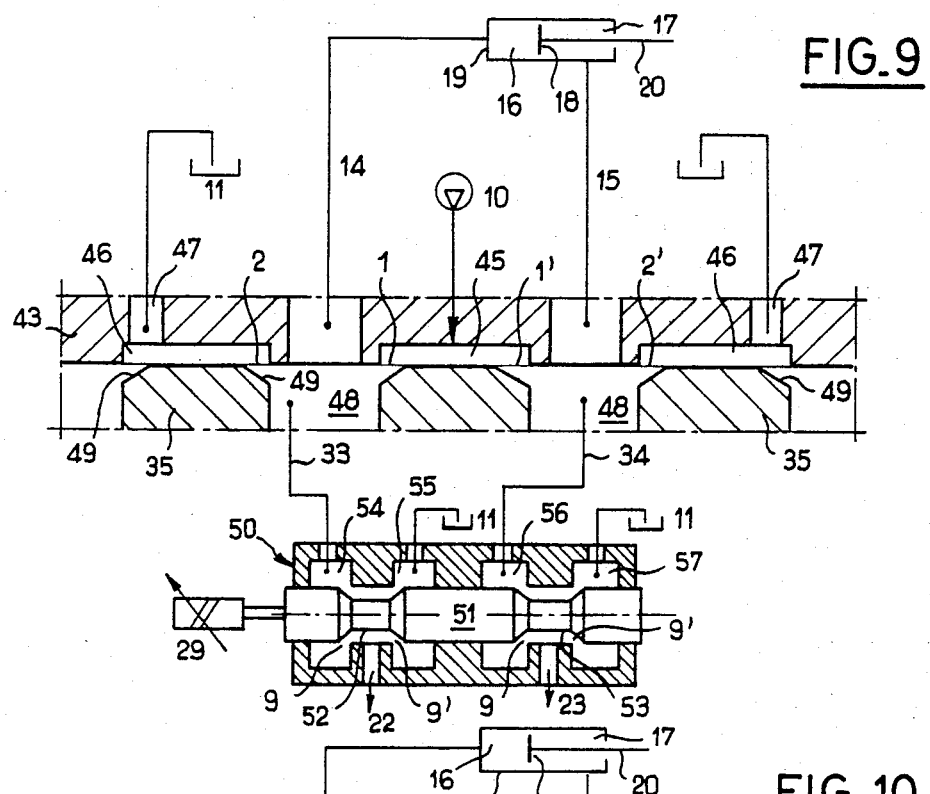
Figure 10:
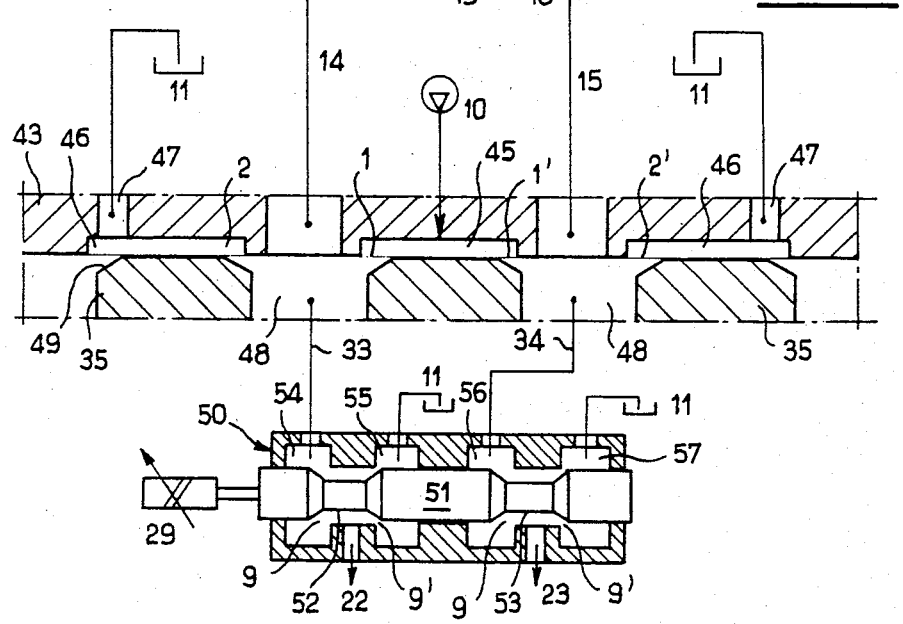

FIGS. 9, 10 and 11 are developed diagrams schematically showing a star-shaped distributor in the rest position and in two distinct actuating positions, respectively; and FIGS. 12, 13 and 14 schematically show in cross-section, partially cut away, said star-shaped distributor in the three positions of FIGS. 9, 10 and 11 respectively.

Figure 1:
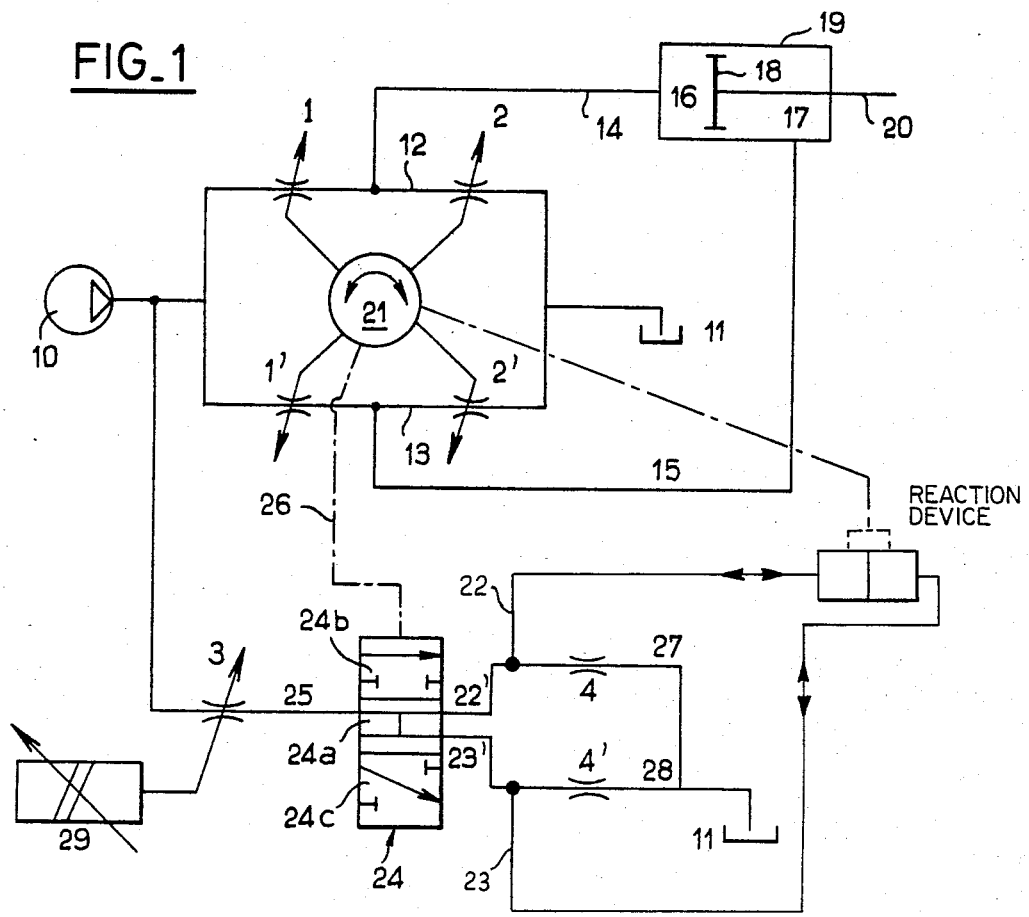
FIG. 1 is a schematic diagram of hydraulic servo-system distributor including the features of the invention.

In the embodiment illustrated in FIG. 1, an hydraulic pump 10 supplies fluid under pressure toward a return line or sump 11 through two parallel circuits 12 and 13 of the distributor, each including at least a pair of variable throttling means or restrictions 1, 2 and 1', 2' respectively. From between the restrictions of each pair, a conduit 14, 15 respectively leads to the respective opposite working chambers 16 and 17 separated by a piston 18 of an assistance device or cylinder 19 for the servo-mechanism, which is controlled by the distributor and the force output is depicted by the piston rod 20. The four restrictions 1, 2 and 1', 2' are simultaneously actuated by a control device 21 displaceable on both sides from a central rest position in such a manner, for instance, when the device 21 is actuated so as to rotate counter-clockwise, on the drawings, the restrictions 1 and 2' close whereas the restrictions 1' and 2 open, whereby the hydraulic fluid from the pump 10 is fed, via conduit 15, to the chamber 17 of the assistance device 19, the fluid within the other chamber 16 of said assistance device being returned to the sump 11 via the conduit 14 and the (open) restriction 2, the piston rod 20 being displaced toward the left on the drawing. Actuation of the control device 21 in the opposite direction produces symmetric inverted effects.

Such a servo-mechanism system may be utilized in different fields well-known from those skilled in the art, for instance in the power assisted steering systems of automotive vehicles. In such an occurence, one of the relative movable members of the control device 21 is connected, via convenient transmission means, to the steering wheel of the vehicle, the other member of said control device being connected to the direction linkage of the wheels or to the piston rod 20, said members being mutually coupled by a lost-motion coupling having a stable central rest position and an amplitude of displacement on both sides of said central rest position determined so as to permit relative displacement of said two members for selectively distributing the working fluid to the assistance device.

The present invention is also suitable for any kind of distributor of the above class, of the piston valve of spool type, of the type including a tubular rotor and stator having alternate longitudinal grooves between which are formed the valve restrictions, or also to the star-shaped valves or valves having a discoidal chamber, such as disclosed in the above mentioned European patent application No. 80401455 or in European patent application No. EP-A-0 021 970 both to the Applicant, the contents of which are supposed integrated here for reference. In any case, it is possible to achieve a valve device ensuring the functions disclosed previously in connection with FIG. 1.

In some circumstances, reaction means are provided for applying onto the member of the control device associated to the steering wheel, forces opposite to the manual actuating force and having an amplitude proportional to the working pressure supplied by the distributor and to the assistance force that the assistance device applies to the direction mechanism of the vehicle.

In the distributors, where the reaction is applied by means of piston means, the practical resulting embodiments are correspondingly made more sophisticated. In the star-shaped distributor, the reaction is applied, according to a different approach, against the opposite edges of arms of the star-shaped rotor, depending upon the direction of actuation of the distributor, so as not to fully exploit the generated reaction pressure; on the other hand, such distributors generally do not permit an external modulation of the magnitude of the reaction applied, more particularly with respect to different running conditions of the vehicle.

For doing this, according to the invention, as illustrated in FIG. 1, there are provided two independent reaction devices one for each direction of actuation of the distributor (not shown), and in the case of a star-shaped distributor valve, said reaction devices will be advantageously of the type disclosed hereinafter. The opposite reaction chambers (not shown) of the reaction devices are each supplied with pressurized fluid by independent circuits 22 and 23 leading from a corresponding outlet of a commutating valve mechanism which may be of any kind utilized in fluidics, and which is illustrated in the drawings, under the form of a three-position valve 24 having an OR logic function, the inlet of which is connected to the pump 10. In the central position 24A, the inlet is connected simultaneously to both outlets 22' and 23' so as the reaction pressure be applied oppositely and with the same magnitude in both reaction chambers, whereby there is no resulting reaction force onto the movable input member of the distributor; in the extreme position 24B, the inlet 25 is connected only to conduit 22, whereas in the opposite extreme position 24C the hydraulic fluid pressure reaches only conduit 23. The spool of the valve 24 is actuated by the movable input member or primary member of the distributor 21 by means of a linkage transmission depicted at 26 so as to be selectively brought toward one or the other of said extreme positions depending upon the direction towards which the distributor is displaced, respectively, from its central rest position, so as to furnish a reaction force controlled solely in the direction corresponding to the actuation of the distributor, e.g. in the direction contrary to the actuation of the steering wheel.

From outlets 22' and 23' of the valve 24 lead toward the sump 11 a conduit 27, 28, respectively, within which are installed stationary restrictions 4,4' respectively which introduce therein a pressure drop so as the obtained reaction pressures permanently remain in a constant proportional relationship with respect to the inlet pressure fed to the inlet 25 of the valve 24. Moreover, in the inlet conduit 25 is further interposed a variable restriction 3 which is controlled by a conventional actuating device 29, for instance of the electromagnetic type, which may be actuated manually or automatically in response to different running or operating parameters of the vehicle, said parameters being for instance determined by a microprocessor forming part of the electronic inboard installation of the vehicle. The system may be regulated so as to furnish, for instance, a relatively hard direction (high reaction) when running in straight lines, or soft direction (low or zero reaction) for lower speed or parking maneuvers.

It will be understood that, in the embodiments where the distributor is of the star-shaped type, the functions achieved by the valve 24 may be obtained by providing on the rotor and/or the stator of the distributing valve convenient throttling edges forming equivalent distributing valve means or restrictions.

Figure 6:
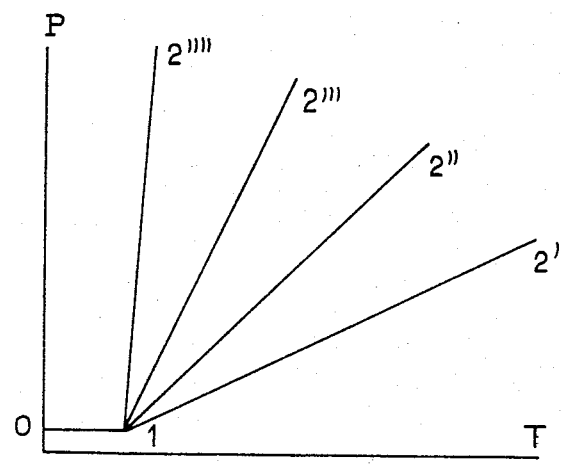

The throttling or closing edges of the distributor system are designed so as those corresponding to the valve device 24 become effective first upon actuation of the distributor, e.g. of the control device 21. In a second step become effective the restrictions 1 and 2', or 1' and 2, depending upon the direction of rotation, which produces the pressure necessary for actuating the system, the restrictions 3 and 4 or 4' producing in each case a reaction pressure which is proportional to the inlet pressure as modulated by the position of the variable restriction 3. There is illustrated in FIG. 6, the curve of the effective pressure furnished by the distributor with respect to the input torque applied to said latter. After a first zero-slope portion 0–1, corresponding to the central operating point of the system and of which point 1 is determined under constructive conditions with respect to the relative dispositions of the edges of the distributor ensuring the functions of the valve means 24, follows a reaction curve 1–2 having a slope varying between the limit 1–2' (maximum reaction, determined by the stationary restrictions 4 and 4') and 1–2'''' (minimum reaction determined by closing of variable restriction 3). By varying the control position of the variable restriction 3 between the extreme position of closing and of opening (1–2'''' and 1–2', respectively), any intermediate curve may be obtained, such as those illustrated at 1–2'' and 1–2'''.

The embodiment illustrated in FIG. 2 differs from the preceding one in that in the rotor and in the stator of the distributor are provided additional cooperating throttling edges forming intermediary restrictions 5 and 5' in each circuit 12 and 13 between the restrictions of the pairs 1, 2 and 1', 2' respectively (or supplemental external valve devices controlled by the control device 21 and furnishing the same effects).

The operative sequence of operation of the different restricting edges upon rotation of the rotor of the distributor is as follows:

The first edges to become effective are those corresponding to the valve means 24, which place the distributing system in the reaction state corresponding to the applied direction of rotation. Then become effective the edges forming the restrictions 5 and 2', which lead to an increase of the actuating pressure P in the distributor but not of the assistance, since said inlet pressure is applied evenly on both sides of the assistance piston 18. The distributing system thus is situated in the operating zone 0-1"-1'-1 of FIG. 7. Thereafter, (in the given direction of rotation) the restriction 1 becomes effective, which causes an increase of the asistance pressure differential and of the inlet pressure P which in turn result in an increase of the reaction pressures, depending upon the direction of rotation of the distributor.

With the above in mind, it will be understood that the portions 0-1 and 1-2 of the characteristic curve are modulated simultaneously in a fixed relationship determined by the constructive dimensions of the system. On the other hand, depending upon the setting of the restriction 3, the characteristic curve may be continuously varied between the limit characteristics 0-1-2 and 0-2''', as illustrated for instance by curves 0-1'-2' et 0-1"-2" in FIG. 7.

Figure 3:
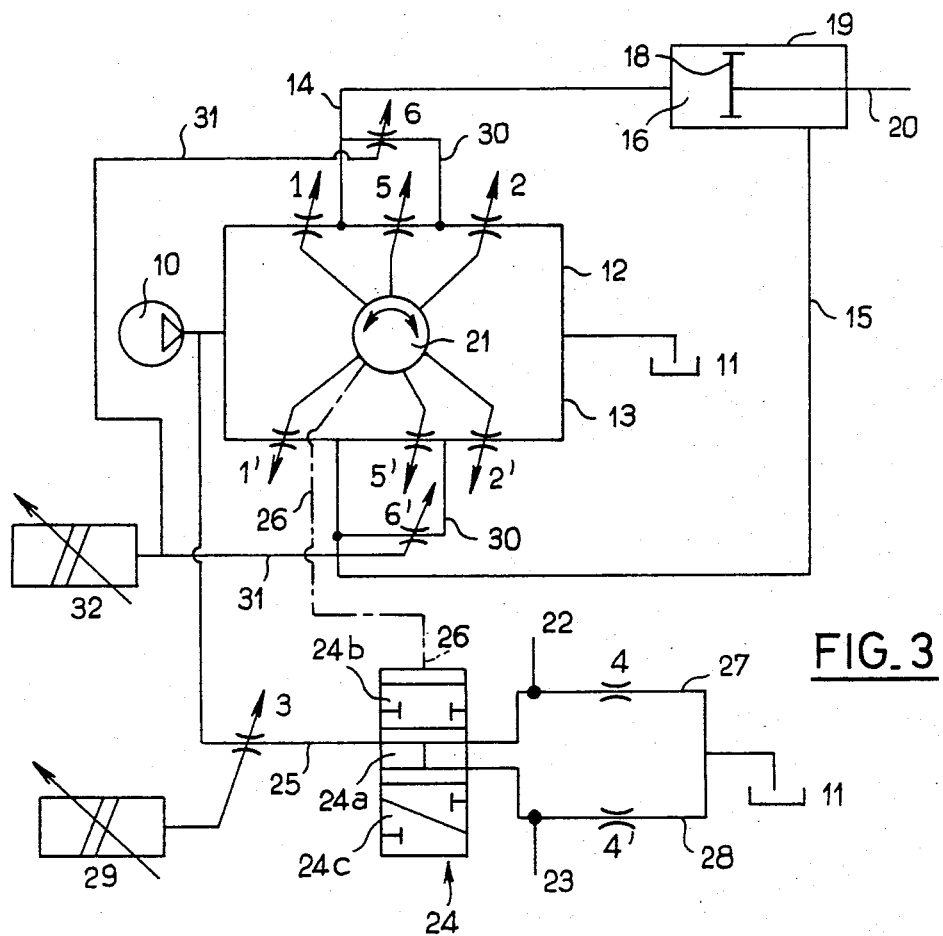

The embodiment illustrated in FIG. 3 differs from the preceding one disclosed in connection with FIGS. 2 and 7 in that it is designed so as to render operation of restrictions 5 and 5' selectively independent of actuation of the distributor assembly; therefore there are simply provided two supplemental variable restrictions 6 and 6' in conduits 30 disposed in parallel, e.g. in by-passing relationship with restrictions 5 and 5', respectively. Said variable restrictions 6 and 6' are actuated, via linked means depicted at 31, by one or two external actuating devices 32, for instance electromagnetic devices, which are operated manually or automatically as from information from the microprocessor of the electronic inboard installation of the vehicle.

Figure 8:
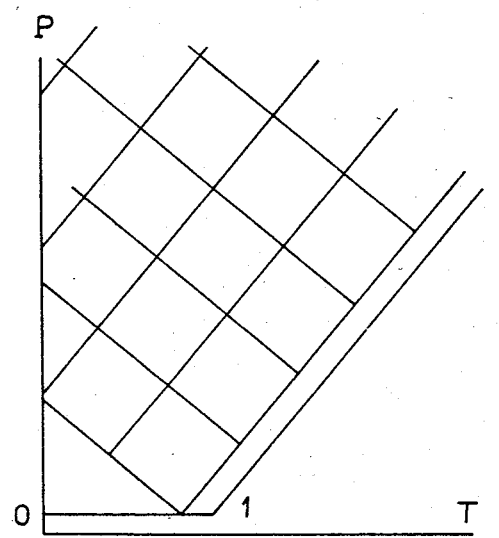

By reason of said additional restrictions, it is possible to selectively vary the fluid flow passing through the cooperating edges or restrictions 5 and 5', since said flow is divided between restrictions 5 and 6 or 5' and 6', respectively, so as to selectively vary the portion 0-1 corresponding to the central point of the steering system, of the characteristic of FIG. 6, with the possibility of obtaining any intermediate characteristic curve in hatched area in the graph of FIG. 8.

The embodiment illustrated in FIG. 4 practically corresponds to the preceding one disclosed in connection with FIG. 1 and differs therefrom in that the (downstream) stationary restrictions 4 and 4' and the (upstream) variable restriction 3 on both sides of the valve means 24 are here substituted respectively by two (downstream) variable restrictions 8 and 8' and one (upstream) stationary restriction 7.

The resulting operating mode is substantially identical to that of the embodiment of FIG. 1, whereby the curves of FIG. 6 still apply for said embodiment of FIG. 4.

The embodiments disclosed in connection with FIGS. 1 to 4 are fully applicable to the star-shaped hydraulic distributor disclosed in the prior co-pending applications to the Applicant, embodying external valve means 24, as previously described, or which have a rotor and a stator provided with cooperating slanted edges designed so as to realize internally the same functions, e.g. logical function OR rather, than said external valve means 24. It is also possible to utilize slanted or shaped edges to realize other restrictions than those illustrated in FIG. 1, for instance on the proper distributor rotor or on an additional rotor of the distributor. A practical convenient solution consists in placing the OR function of the valve mechanism 24 internally of the distributor (as illustrated in FIGS. 9-14) by means of the primary restrictions 1 and 1' of the distributor which, in all embodiments, open to feed hydraulic fluid under pressure toward a respective chamber of the assistance device 19, which determines, depending upon the rotation of actuation of the rotor, the actuation direction of the steering mechanism directly related to the displacement of the rotor away from its central rest position. On doing this, it is sufficient, as illustrated in FIG. 5, which on the other hand exactly corresponds to the embodiment of FIG. 1, to take the fluid under pressure which should feed, via conduits 22 and 23, the reaction chambers corresponding to the determined directions of actuation, from the outlets 14 and 15 feeding the working chambers of the assistance device 19 and corresponding to the same direction of actuation, respectively, directly downstream said primary restrictions 1 and 1'.

Figure 5:
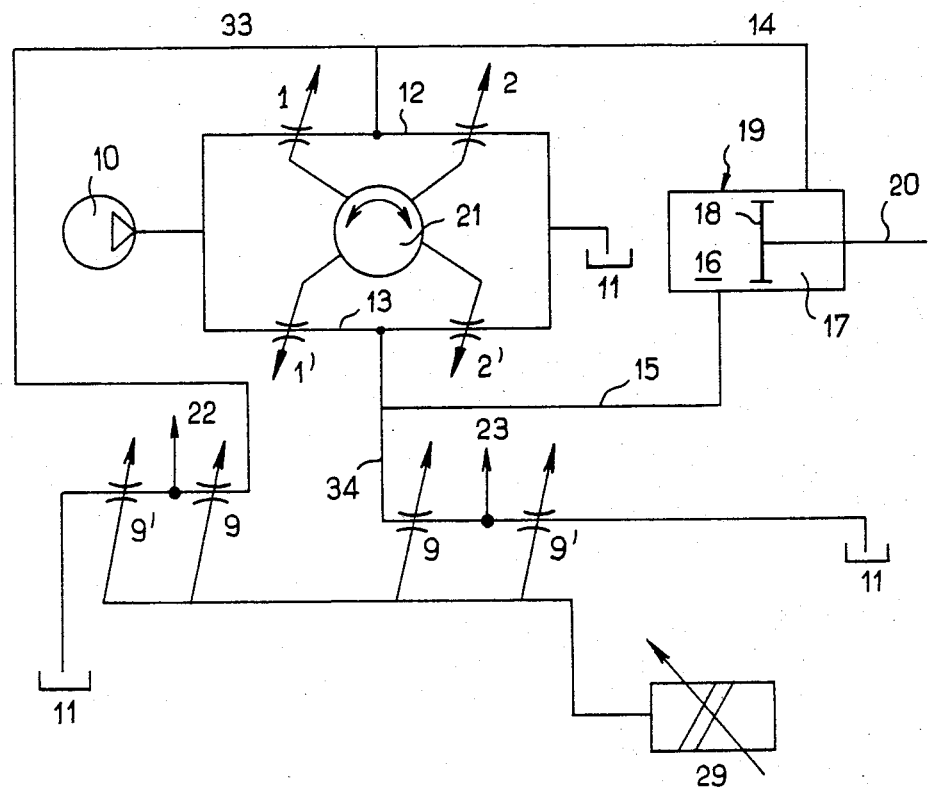

In such an arrangement, the modulation of the reaction pressure is as schematically illustrated in FIG. 5: from the working conduits 14 and 15 independent derivations 33 and 34, respectively, lead to the sump 11, each derivation including a variable pressure divider consisting of two serially arranged restrictions 9 and 9' which are adjustable simultaneously so as one of said restrictions closes when the other opens, and vice versa. The reaction conduits 22 and 23, for each direction of rotation, lead from between the restrictions 9 and 9' of each pair in the derivation circuits, in such a manner that when, in a given direction of rotation, the upstream restriction 9 fully opens and the downstream restriction 9' is totally closed, the reaction pressure is maximum, and conversely. Both pairs of restrictions 9 and 9' for both derivation circuits are actuated simultaneously by a common actuating device 29, for instance an electromagnetic device, in such a manner that said restrictions tend to increase the reaction pressure in the same direction of operation but with the fluid under pressure only reaching the divider which corresponds to the direction of rotation as determined by the rotation of the distributor, operation of the whole device being identical to that disclosed in FIG. 6 in connection with the embodiment of FIG. 1.

There is illustrated in FIGS. 9 to 14 a practical embodiment of the previously disclosed functional schemes, embodying a star-shaped rotative distributor valve. The distributor valve typically comprises a disc-shaped rotor 35 having a contoured central opening, for instance of triangular shape, for coupling to a correspondingly shaped actuating shaft member 36, the rotor 35 having at least three outwardly radially extending angularly spaced arms 37. An intermediary spacing annular plate 38 has an inner surface in sealed contact engagement with the mean cylindrical peripheral surface of the rotor body and includes angularly spaced recesses within which are sealingly and slidingly received the ends of the respective arms 37 of the rotor 35, so as to define in each of said recesses a pair of independent reaction chambers 39 and 40. Two axially opposite annular plates or discs 43, not shown in FIGS. 12 to 14 for better clarity of the drawings, surround axially in a stacked relationship the rotor 35 and the intermediary annular plate 38. Axial bores 41 extend through the three stacked plates for receiving corresponding bolts for rigidly securing the stator assembly onto the primary member of the steering mechanism, e.g. the secondary member of the valve distributor.

Different seals, such as those indicated at 42, are provided to sealingly separate one from each other the different chambers or recesses of the distributing device.

The end plates of the distributor, such as the one illustrated at 43 in FIGS. 9 to 11, comprise radially extending slots 44 (FIGS. 12-14) each communicating with the inlet of fluid under pressure of the device connected to the pump 10 and defining innerly in the distributor, e.g. at the level of the rotor 35, angularly spaced inlet chambers 45. On both sides, peripherally, of each inlet chamber 45 the plates 43 are each formed with recesses which define discharge chambers 46 from which lead a conduit 47 towards the sump 11. The inlet chambers 45 and the discharge chambers 46 angularly alternate and are mutually sealingly separated, the central body of the rotor 35 defining between said chambers 45 and 46 working chambers 48 each in slight mutual overlapping relationship with an inlet chamber 45 and a discharge chamber 46 in the rest or central position of the distributor, the substantially radially extending edges of the working chambers 48 being slanted or chamfered as depicted at 49 for cooperation with the adjacent edges of the inlet chambers 45 and discharge chambers 46 so as to selectively constitute the restrictions 1 and 2, on the left (in FIGS. 9 to 11) of an inlet chamber 45, and 1' and 2', on the right (in the figures) of said inlet chamber. From the working chambers 48 extend, on one hand, the distribution conduits 14 and 15 leading respectively to the working chambers of the assistance device or cylinder 19, and on the other hand, the derivation circuits 33 and 34 which in turn lead to the reaction modulating means. In the embodiment illustrated in FIGS. 9 to 11, said reaction modulating means is in the form of a unitary sliding valve device designated generally by reference numeral 50 which comprises a spool 51 connected to the (electromagnetic) actuating device 29 and formed peripherally with two axially separated annular grooves 52 and 53; the spool 51 is slidingly received within a corresponding bore of the valve body which is in turn formed with two axially separated pairs of annular grooves 54, 55 and 56, 57, the inner edges of which form with the outer edges of the grooves 52, 53 of the spool 51 the variable restrictions 9 and 9' of each reaction circuit.

In FIGS. 9 and 12, the distributor is depicted in its central rest position. In such a condition, fluid under pressure from pump 10 is divided evenly on both sides of the distributor, through restrictions 1 and 2 in one direction and 1', 2' in the opposite direction. The pressure drops at the level of said restrictions are, in said condition, substantially nil. On the other hand, the possible reactions are balanced on both sides of the system. The control distributor thus has no effect on the steering system.

In rotating the steering wheel, there is accordingly a relative displacement of the rotor 35 with respect to the stator end plates 43 whereby, in the case of a displacement in a clockwise direction in FIGS. 12 to 14, e.g. towards the right in FIGS. 9 to 11, the restrictions 1' and 2 realize a throttling of the fluid path inducing a pressure drop which in turn results in a pressure increase in the working chamber 48 on the left side of FIG. 10 (which corresponds, in linear developed fashion, to FIG. 13). The restriction 2' opens simultaneously proportionally and the working chamber 48 on the right of FIG. 10 is thus in substantially direct communication with the sump 11 via conduit 47, whereby there is created in distribution chambers 14 and 15 differential pressure causing the assistance cylinder or device 19 to displace its output rod 20 towards the right in FIG. 10. In parallel with the restrictions 1' and 2 of the distributor are the restrictions of the modulating valve mechanism 50, one of the pair of restrictions 9 and 9' depending upon the direction of operation, whereby the chamber or annular groove 54 of the modulating servo-valve 50 receives the same working pressure as that reaching the "operative" working chamber 16 of the cylinder 19, the corresponding chamber 56 of the other pair of the servovalve 50 being thus connected to the sump 11 via conduit 34, the working chamber 48 of the distributor on the right of the figure and the discharge conduit 47. In the modulating valve 50, the fluid flow passing through the restrictions 9 and 9' of the pair at the left of FIG. 10 is related to the throttling section of said restrictions and to the working pressure on the respective sides (left working chamber 48) of the system. Assuming that, as illustrated in FIG. 10, the spool 51 of the modulating valve 50 is displaced towards the left in the drawing, the downstream restriction 9' is diminished whereby the reaction pressure within the chamber formed by the annular groove 52 is transmitted through conduit 22 to the corresponding reaction chamber 39 so as to act onto the reaction arms 37 of the rotor 35 in the direction opposite to the direction of actuation of the rotor (FIG. 13). The restrictions 9 and 9' of the pair on the right of the modulated valve 50 as seen in FIG. 10, produce a similar effect with the difference that the pressure reaching the annular chamber 56 is substantially reduced as also the reaction pressure reaching the opposite reaction chamber 39, whereby onto the reaction arms 37 of the star-shaped rotor are exerted differential pressures which bias the rotor and accordingly the input member of the steering wheel in the direction opposite to the direction of actuation of the rotor, as above mentioned.

In such conditions, the reaction obtained is illustrated by the curve 0-1-2' of the diagram of FIG. 6. The reaction increases proportionally to the displacement towards the left of the spool 51 of the modulating valve 50 (as seen in the drawings).

If, on the contrary, the spool 51 of the modulating valve 50 is displaced towards the right, as illustrated in FIG. 11, the upstream restrictions 9 then define a flow passage section lower than that of the downstream restriction 9', whereby the reaction pressure in chamber or groove 52 (on the left of the drawing) is only a part of the working pressure prevailing in the working chamber 48 of the distributor valve. If the displacement of the spool 51 is maximum in said direction (towards the right), there is obtained the minimum reaction curve 0-1-2 of FIG. 6, and if the spool 51 is displaced continuously between said above-mentioned limit conditions, any curve intermediate between said limit curves can be obtained.

It should be understood that the features of each of the previously described embodiments may be incorporated within other embodiments to obtain a corresponding combination of the expected results. Thus, for instance, the restrictions 5 and 5', as also eventually the restrictions 6 and 6' in the embodiments of FIGS. 2 and 3, may be respectively incorporated within the embodiment illustrated in FIG. 5 to obtain the operative results illustrated in FIGS. 7 and 8, respectively.

I claim:

1. A hydraulic distributor for a servo-mechanism, more particularly for a power-assisted steering system of an automotive vehicle, comprising a primary member and a secondary member defining mutually distribution valve means selectively modulable upon a limited relative displacement of said primary and secondary members on both sides of a central position, said primary member being connected to an input actuating member and to a reaction device hydraulically actuated by externally modulated reaction pressures, said secondary member being connected to a driven mechanism coupled to a hydraulic assistance device controlled by the distributor, characterized in that the reaction device has a pair of fluid inlets each connected respectively to an independent fluid flow circuit extending from a corresponding outlet of OR logic function valve means which is actuated by said primary member to which said OR logic function valve means is positively coupled, the OR logic function valve means becoming operative before the distribution valve means of the distributor becomes operative.

2. The distributor according to claim 1, characterized in that each independent fluid flow circuit is derived from a corresponding modulation fluid flow circuit including at least an externally controlled variable restriction in communication with said OR logic function valve means.

3. The distributor according to claim 2, characterized in that each said modulation fluid flow circuit comprises at least one restriction downstream said derivation from said independent fluid flow circuit.

4. The distributor according to claim 3, characterized in that said externally controlled variable restriction is located downstream said OR logic function valve means, said variable restrictions of both said modulation fluid flow circuits being actuated simultaneously.

5. The distributor according to claim 3, characterized in that an externally controlled variable restriction is located upstream said OR logic function valve means.

6. The distributor according to claim 5, characterized in that the modulation pressure in said modulation fluid flow circuits is obtained from the pressure inlet of the distributor.

7. The distributor according to claim 4, characterized in that the modulation pressures in said modulation fluid flow circuits are obtained from the working chambers of said assistance device.

8. The distributor according to claim 7, comprising two parallel circuits between a source of pressure and a sump, from each of which extends a conduit leading respectively to the working chambers of said assistance device, each of said parallel circuits including restrictions actuated by said primary member on both sides of the point from which extend the respective conduits, characterized in that said restrictions are actuated in such manner that, in a first step, one restriction on the side of said sump closes for determining the point of hydraulic balance of the steering system, and, in a second step, one of said restrictions on the side of said pressure source closes for creating the pressure differential for controlling said assistance device.

9. The distributor according to claim 8, characterized in that said distributor comprises, in each said parallel circuit, two serially arranged restrictions on the side of said sump.

10. The distributor according to claim 9, characterized in that the distributor comprises, in each said parallel circuit, a restriction in parallel with the downstream restriction adjacent said working derivation, said restriction being externally controllable for modulating the point of hydraulic balance of the steering system.

11. The distributor according to claim 8, comprising a star-shaped rotor forming said primary member and a stator forming said secondary member, one of said rotor and stator being formed with inlet pressure apertures and adjacent discharge apertures, working apertures being formed in the other of said members between said adjacent discharge apertures of said one member, so as to define therebetween variable restrictions, reaction chambers being defined by arms of said rotor received within recesses of said stator, characterized in that said reaction chambers are independent of said working apertures.

12. The distributor according to claim 11, characterized in that said OR logic function valve means comprises a pair of throttling edges located on both sides of an inlet pressure aperture of the distributor.

13. The distributor according to claim 12, characterized in that said pair of throttling edges belongs to said working apertures.

14. The distributor according to claim 13, characterized in that said reaction chambers each communicate with a median point of a circuit extending between said working apertures and said sump, between two serially arranged variable restrictions of said circuits which are controlled externally in opposite directions.

15. The distributor according to claim 1 wherein said positive coupling comprises a mechanical connection.

* * * * *